US009020558B2

(12) United States Patent
Aio et al.

(10) Patent No.: US 9,020,558 B2
(45) Date of Patent: Apr. 28, 2015

(54) WIRELESS COMMUNICATION SYSTEM, COMMUNICATION METHOD, AND BASE STATION

(71) Applicant: Hitachi, Ltd., Tokyo (JP)

(72) Inventors: Kosuke Aio, Yokohama (JP); Yoshiaki Hasegawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 13/788,493

(22) Filed: Mar. 7, 2013

(65) Prior Publication Data

US 2013/0324181 A1 Dec. 5, 2013

(30) Foreign Application Priority Data

May 29, 2012 (JP) ................ 2012-122039

(51) Int. Cl.
*H04W 52/04* (2009.01)
*H04W 52/36* (2009.01)
*H04W 52/42* (2009.01)

(52) U.S. Cl.
CPC ............ *H04W 52/04* (2013.01); *H04W 52/367* (2013.01); *H04W 52/42* (2013.01)

(58) Field of Classification Search
CPC .................................................. H04W 52/04
See application file for complete search history.

(56) References Cited

U.S. PATENT DOCUMENTS

2007/0060062 A1* 3/2007 Wengerter et al. ............ 455/63.2
2009/0296629 A1* 12/2009 Lincoln et al. ................ 370/321
2012/0134441 A1 5/2012 Yokomakura et al.
2012/0170624 A1* 7/2012 Rozenblit et al. ............. 375/219
2012/0314640 A1 12/2012 Kim et al.
2013/0324181 A1* 12/2013 Aio et al. ...................... 455/522

FOREIGN PATENT DOCUMENTS

| EP | 2525618 A2 * | 11/2012 |
| JP | 2005-341176 A | 12/2005 |
| JP | 2011-029743 A | 2/2011 |
| JP | 2011-087141 A | 4/2011 |
| WO | WO-2011/105856 A2 | 9/2011 |

OTHER PUBLICATIONS

Japanese Office Action for Application No. 2012-122039 dated Sep. 2, 2014.

* cited by examiner

*Primary Examiner* — Bobbak Safaipour
(74) *Attorney, Agent, or Firm* — Foley & Lardner LLP

(57) ABSTRACT

It is provided a wireless communication system comprising a terminal device and a base station. The terminal device includes a plurality of wireless transmitters, an antenna coupled to each of the wireless transmitters, and a controller generating a signal to be transmitted from the antenna. The base station includes a plurality of wireless receivers, an antenna coupled to each of the wireless receivers, and a controller. The terminal device holds a predetermined upper limit of power consumption. The base station changes at least one of a MIMO multiplexing number, a modulation system, and a coding rate so that communication is performed according to a communication system that can communicate at allowable transmission power of the terminal device in case where power consumption of the terminal device exceeds the upper limit upon performing the MIMO transmission at maximum transmission power according to the wireless standard.

12 Claims, 8 Drawing Sheets

| NUMBER OF UL TRANSMISSION ANTENNA | ONE | TWO | THREE | FOUR |
|---|---|---|---|---|
| ALLOWABLE TRANSMISSION POWER | 24.0 dBm | 22.0 dBm | 21.0 dBm | 20.0 dBm |

*Fig. 2*

| MCS NUMBER | MODULATION SYSTEM AND CODING RATE | TRANSMISSION BIT NUMBER | TARGET SNR |
|---|---|---|---|
| 0 | QPSK, 1/2 | 1 | 2.9 dB |
| 1 | QPSK, 3/4 | 1.5 | 6.3 dB |
| 2 | 16QAM, 1/2 | 2 | 8.6 dB |
| 3 | 16QAM, 3/4 | 3 | 12.7 dB |
| 4 | 64QAM, 2/3 | 4 | 13.8 dB |
| 5 | 64QAM, 3/4 | 4.5 | 16.9 dB |

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| FOUR | 17 dB | 64QAM | 3/4 | 18.0 | 21.0 dBm |

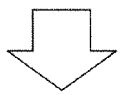

METHOD (1)

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| FOUR | 14 dB | 64QAM | 2/3 | 16.0 | 18.0 dBm |

METHOD (2)

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| THREE | 17 dB | 64QAM | 3/4 | 13.5 | 19.5 dBm |

Fig. 8

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| FOUR | 13 dB | 16QAM | 3/4 | 12.0 | 21.5 dBm |

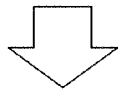

METHOD (1)

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| FOUR | 9 dB | 16QAM | 1/2 | 8.0 | 17.5 dBm |

METHOD (2)

| NUMBER OF TRANSMISSION ANTENNA | TARGET SNR | MODULATION SYSTEM | CODING RATE | TRANSMISSION BIT NUMBER | TOTAL TRANSMISSION POWER |
|---|---|---|---|---|---|
| THREE | 13 dB | 16QAM | 3/4 | 9.0 | 20.0 dBm |

Fig. 9

| NUMBER OF ANTENNA | ONE | TWO | THREE | FOUR |
|---|---|---|---|---|
| TRANSMISSION POWER (NORMAL TIME) | 24.0dBm | | | |
| TRANSMISSION POWER (POWER-SAVING MODE) | 21.5dBm | 19.0dBm | 17.5dBm | 15.5dBm |

WIRELESS COMMUNICATION SYSTEM, COMMUNICATION METHOD, AND BASE STATION

CLAIM OF PRIORITY

The present application claims priority from Japanese patent application JP 2012-122039 filed on May 29, 2012, the content of which is hereby incorporated by reference into this application.

BACKGROUND OF THE INVENTION

The present invention relates to a wireless communication technique that can suppress power consumption of a terminal installing a plurality of antennas.

In recent years, an increase in throughput has been demanded in various wireless communication systems. The MIMO (Multiple Input Multiple Output) technique is given as one technique for achieving this increase in speed. In this MIMO technique, data spatial multiplexing is performed by combining a plurality of antennas (wireless transmitter and wireless receiver) to improve the throughput and frequency utilization efficiency without changing the bandwidth or transmission power. Today, the MIMO transmission is performed with a plurality of antennas mounted on various communication devices as typified by IEEE 802.11n (WiFi). For further increasing the throughput in the future, the increase in number of antennas (data multiplexing number) is expected, so that the MIMO technique is attracting more and more attention.

The improvement in throughput has been demanded recently in a mobile terminal such as a mobile router, a USB type data communication card, and the like that can be used for IEEE 802.16 (WiMAX) and 3GPP Long Term Evolution (LTE), whereby the use of the MIMO technique has been required.

SUMMARY OF THE INVENTION

A communication terminal having employed the MIMO technique, described above, has the following problems.

The communication terminal needs to have wireless transmitters, whose number is equal to the number of transmission antennas. Meanwhile, a power amplifier (PA) installed at a final stage of the wireless transmitter consumes a large amount of power, which occupies a large proportion of the total power consumption of the terminal. Accordingly, the communication terminal with the plural transmission antennas having employed the MIMO requires more PAs than a terminal having only one transmission antenna (SISO: Single Input Single Output), resulting in a drastic increase in the maximum power consumption.

Another problem of the mobile terminal lies in the specification of the maximum power consumption of the terminal. The maximum values of the power consumption and the current consumption of each terminal are defined depending on its model. A USB type SISO terminal of WiMAX with a maximum transmission output of +23 dBm (200 mW) is taken as an example. In the case of USB 2.0, the specification of a power source supplied from a USB interface is defined as follows: the current consumption is 500 mA or less; and the power consumption is 2.5 W or less. On the other hand, for allowing this terminal to transmit at +23 dBm, the output power of the PA needs to be +24 dBm (approximately 250 mW) assuming the loss from the PA to the antenna end as 1 dB.

For example, in case where the efficiency of the PA is 25%, the power consumption of the PA can be estimated as approximately 1.25 W. In case where the total power consumption of the other elements other than the PA, such as an IC chip and other RF components, is approximately 1 W, the maximum power consumption of this terminal can be estimated as approximately 2.25 W. This result indicates that, in case of a WiMAX USB type terminal, even the SISO terminal allows small margin relative to a default power consumption value of the USB interface of 2.5 W; in case where the MIMO with two antennas is installed, the power consumption further increases, in which case the specification of the power consumption is extremely difficult to satisfy.

For reducing the power consumption of the terminal, the improvement of the power efficiency of the PA, which consumes a large amount of power, is essential; however, it is difficult to drastically improve the efficiency. In view of this, as aforementioned, a method may be employed in which the number of transmission antennas in the communication terminal having employed MIMO is set to only one so as not to exceed the specification of the power consumption, and the terminal is designed for performing the uplink access with only SISO transmission. However, there is a large difference in throughput between the MIMO terminal and the SISO terminal; therefore, abandoning MIMO because of the regulation of the power consumption conflicts with the demand of higher speed. As a result, the communication terminal has an object to achieve both the increase in speed of wireless communication with MIMO and satisfaction of the specification of the power consumption.

As a technique for efficiently reducing the power consumption of the terminal, a method has been suggested in which the number of transmission antennas is controlled in accordance with the reception environment (for example, see JP 2011-87141 A). In general, a wireless device is not required to always have high transmission power and its transmission power is controlled by selecting a modulation system and a coding rate (MCS: Modulation and Coding Scheme) in accordance with the reception environment obtained from the value of a signal-to-noise ratio (SNR: Signal to Noise Ratio) or the like. In the technique disclosed in JP 2011-87141 A, this transmission power control according to the reception environment is utilized to control the MIMO transmission according to the required amount of the transmission power. For example, in case where the reception environment is favorable and the large amount of the transmission power is not required, such as when the terminal is positioned near the base station, the mobile terminal performs the MIMO transmission with the plural antennas. Meanwhile, in case where the reception environment is poor and the large amount of transmission power is required, such as when the terminal is positioned at an end of a cell (range where radio waves transmitted from the base station can reach), the number of transmission antennas of the terminal is reduced or the transmission is switched to the SISO transmission, thereby suppressing the power consumption. By thus controlling the MIMO transmission when the power consumption increases, the power consumption of the communication terminal is efficiently reduced.

However, the following two problems occur in case where the aforementioned prior art is applied to solve the present problem. One problem lies in the setting of the maximum transmission power. In the above prior art whose object is to suppress the power consumption, the maximum transmission power of the terminal follows the default value of the communication system and the transmission control considering the specification of the power consumption of the terminal (for example, 2.5 W in the USB terminal) is not made. Therefore, there is a possibility that the transmission power exceeding the specification of the power consumption of the terminal might be required depending on the threshold value of the transmission power that switches the number of transmission antennas.

The other problem is that the control threshold values of all the terminals are set to be the same. The specification of the power consumption is defined according to the interface specification of the terminal, and even though the same interface is used, the value of the maximum power that can be output at the same consumption power is different depending on the performance of the IC chip and the PA mounted on the interface. In other words, the transmission power that is allowable (allowable transmission power) is different for each terminal. Therefore, for applying the same control threshold value to all the terminals, the threshold value needs to be set that is applicable to the terminal whose allowable transmission power is the lowest. In this case, excessive suppression is performed on the other terminals having margin, thereby causing a significant hindrance in improvement of the entire communication efficiency.

Advantageous Effects of Invention

The representative one of inventions disclosed in this application is outlined as follows. There is provided a wireless communication system for performing MIMO transmission, comprising a terminal device employing a MIMO technique on at least a transmission side, and a base station communicating with the terminal device. The terminal device includes a plurality of wireless transmitters, a transmission antenna coupled to each of the wireless transmitters, and a controller generating a signal to be transmitted from the antenna. The base station includes a plurality of wireless receivers, a reception antenna coupled to each of the wireless receivers, and a controller generating a control signal to be transmitted to the terminal device. The terminal device holds a predetermined upper limit of power consumption. The base station changes at least one of a MIMO multiplexing number, a modulation system, and a coding rate so that communication is performed according to a communication system that can communicate at allowable transmission power of the terminal device in case where power consumption of the terminal device exceeds the upper limit upon performing the MIMO transmission at maximum transmission power according to the wireless standard.

According to an embodiment of the present invention, the throughput can be improved within the range of the specification of the power consumption in accordance with the communication environment.

BRIEF DESCRIPTION OF THE DRAWINGS

The present invention can be appreciated by the description which follows in conjunction with the following figures, wherein:

FIG. 2 is an explanatory diagram illustrating examples of allowable transmission power notified to the base station from the terminal according to the first embodiment;

FIGS. 8 and 9 are explanatory diagrams illustrating specific examples of resetting transmission power according to the first embodiment;

DETAILED DESCRIPTION OF THE PREFERRED EMBODIMENTS

Figure 1:
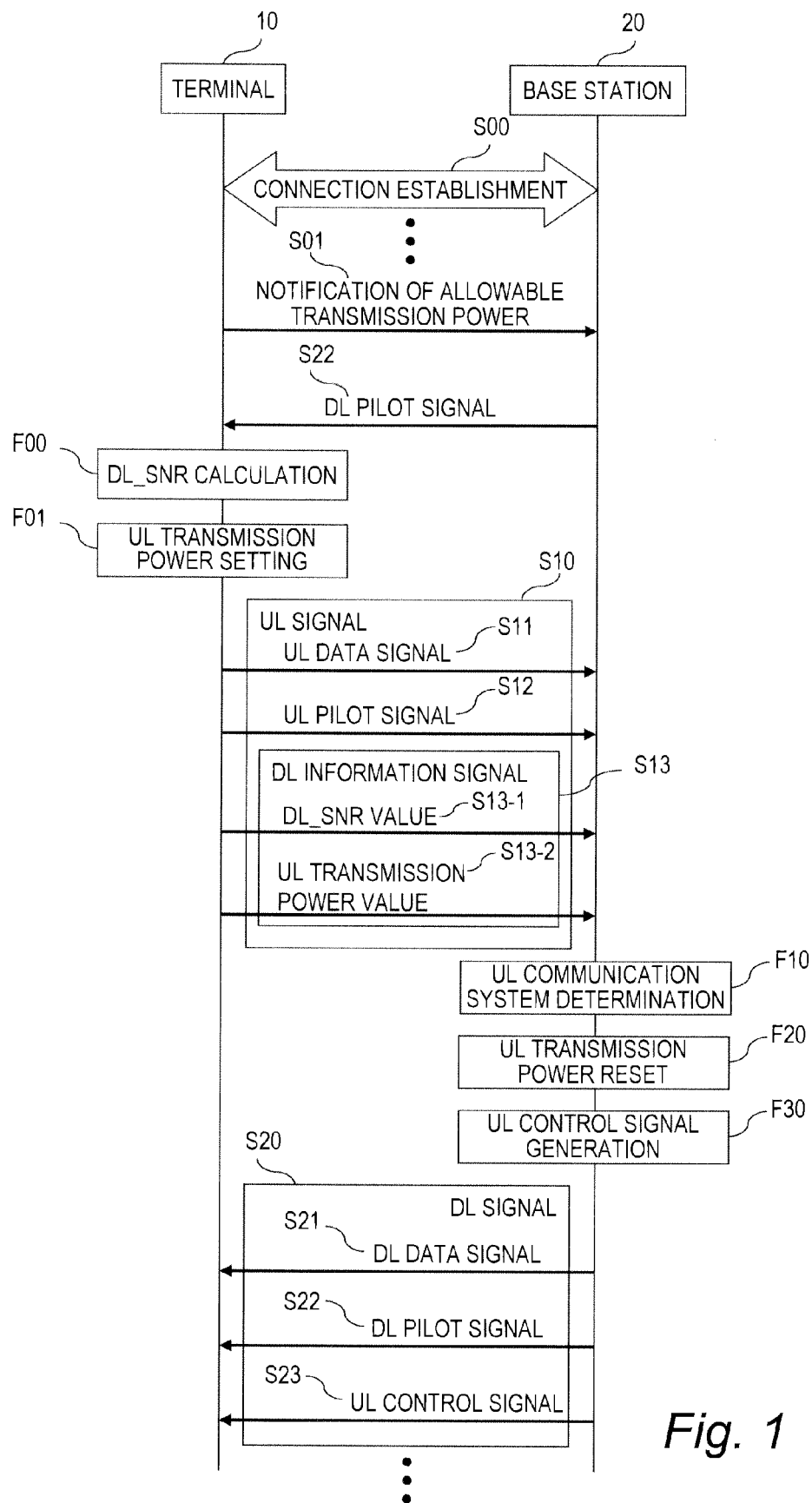
FIG. 1 is a sequence diagram illustrating exchange of data between a terminal and a base station according to a first embodiment of this invention.

First, the summary of an embodiment of the present invention is described.

In an embodiment of the present invention, the following are performed in a mobile terminal having employed MIMO for improving the throughput without exceeding the specification of the power consumption:
(1) the number of transmission antennas of MIMO is controlled according to the propagation path status;
(2) scheduling is performed so as to achieve both the suppression of power consumption and the increase in throughput; and
(3) a flexible control threshold value according to the specification of the power consumption of each terminal is set.

In view of these, in this embodiment of the present invention, the terminal and the base station exchange information as described below.

The terminal notifies the base station of the transmission power that is allowed at maximum so as not to exceed the specification of the power consumption of the terminal itself when the connection with the base station is established (hereinafter, the transmission power is called allowable transmission power). This maximum allowable power corresponds to data held inside the terminal and different values are defined as the maximum allowable power depending on the number of transmission antennas of the terminal.

The base station is, as known in the conventional art, allocates the modulation and coding scheme on the terminal side and further determines the increase or decrease of the transmission power of the terminal on the basis of the SNR of the base station to allocate the transmission power. Further, in the present invention, the base station calculates the transmission power of the terminal on the basis of the information received from the terminal and compares the transmission power with the allowable transmission power of the terminal. In case where the total transmission power is more than the allowable transmission power, the base station reduces the number of transmission antennas or changes the modulation system with a lower transmission rate, thereby reallocating the optimal communication system.

The base station determines the optimal communication system in consideration of the power consumption of the terminal and transmits a control signal to the terminal side.

Thus, for example, in case where the terminal is positioned near the base station and the propagation loss is small (reception SNR is high), high transmission power is not required; therefore, even though a plurality of antennas is used, the power consumption does not exceed the specification. As a result, communication at high throughput can be achieved. Meanwhile, in case where the terminal is positioned far from the base station and the propagation loss is large (reception SNR is low), the transmission power required for the terminal is high. Accordingly, in case where the transmission is performed at the aforementioned power, the transmission power might exceed the specification of the power consumption of the terminal. In this case, the MIMO transmission is controlled in a manner that, for example, the modulation factor of the terminal is reduced or the number of transmission antennas of the terminal is reduced, so that the communication with the base station is made while the power consumption is reduced.

Examples of the present invention are hereinafter described with reference to drawings. Although Examples will mainly describe the system in which the WiMAX communication system is used, the present invention is easily applicable to a system in which other communication systems are used.

<First Embodiment>

The first Embodiment describes an example of a base station 20 and a mobile terminal device 10 having employed MIMO having the aforementioned problems.

FIG. 1 is a sequence diagram illustrating the exchange of data between the terminal 10 and the base station 20 according to the first embodiment. In the first embodiment, notification of allowable transmission power (S01), notification of UL transmission power value (S13-2), and transmission power resetting process (F20) are newly added to conventional data exchange (sequence diagram).

First, connection is established between the terminal 10 and the base station 20 (S00). In the first embodiment, the terminal 10 notifies the allowable transmission power as initial information (S01). This information on the allowable transmission power corresponds to data held inside the terminal 10. The base station 20 stores the received information on the allowable transmission power in a memory.

After that, the base station 20 transmits a DL pilot signal (S22).

After receiving the DL pilot signal S22, the terminal 10 calculates the reception SNR (DL_SNR) of the DL signal (F00). The terminal 10 sets its transmission power (F01) and determines the power for transmitting a UL signal S10. The transmission power set here is generally used for the process performed inside the terminal 10.

After that, the terminal 10 transmits an uplink signal (UL signal) to the base station 20 (S10). The UL signal S10 includes a UL data signal S11, a UL pilot signal S12, and a DL information signal S13. The DL information signal S13 includes a DL_SNR value S13-1 and a UL transmission power value S13-2. In other words, the terminal 10 transmits the UL signal S10 to the base station 20, the UL signal S10 including, as the DL information signal S13, the UL transmission power value S13-2 corresponding to the result of performing the transmission power setting F01 on the UL signal to be transmitted. In the transmission power resetting process F20, the base station 20 uses the received UL transmission power value S13-2 for calculating the UL transmission power next time.

After receiving the UL signal S10, the base station 20 determines control parameters (such as transmission power, and modulation and coding scheme) for transmitting the UL signal next time. In the conventional procedure, the base station 20 executes the UL communication system control process that determines the control parameters for transmitting the UL signal next time, with the use of the UL pilot signal S12 and the DL information signal S13 (DL_SNR value S13-1) included in the received UL signal S10 (F10). In the first embodiment, the base station 20 compares the next-time UL transmission power determined in the UL communication system control process F10 and the value of the allowable transmission power acquired at the time of establishing the connection S00. In case where the transmission power value is more than the allowable transmission power, the base station 20 resets the communication system so that the next-time UL transmission power is less than or equal to the allowable transmission power (F20).

Then, the base station 20 generates the UL control signal including the determined control parameters (F30), and transmits the generated UL control signal to the terminal 10 as a downlink signal (DL signal) (S20 and S23). It should be noted that the DL signal S20 includes a DL data signal S21, the DL pilot signal S22, and the UL control signal S23. The terminal 10 controls the transmission of the UL signal S10 following the acquired control signal S23.

Moreover, the terminal 10 and the base station 20 repeat the process of F00, F01, S10, F10, F20, F30, and S20.

In the transmission power resetting process F20, the next-time UL transmission power value is calculated using the increase or decrease value of the UL transmission power calculated in the UL communication system determination F10 and the UL transmission power value S13-2 in the DL information signal S13.

FIG. 2 is an explanatory diagram illustrating examples of allowable transmission power notified to the base station 20 from the terminal 10 according to the first embodiment.

In the first embodiment, the terminal 10 has four antennas, and information on each allowable transmission power in case where the number of antennas that transmit the UL signal varies from one to four is described.

The allowable transmission power is the upper limit of the transmission power that does not exceed the specification of the power consumption of the terminal device 10, and is the total transmission power of the streams. For example, the transmission power of each stream allocated when the consumption power is the maximum is led and the sum thereof is defined as the allowable transmission power.

The allowable transmission power depends on the characteristic of a power amplifier (final-stage amplifier) included in the terminal 10. Moreover, the value of the allowable transmission power is different in case where the optimal points of the power amplifiers used in the wireless transmitters (output power at which the power efficiency is maximum) are equal to each other and in case where the optimal points are different between the power amplifiers. In this manner, the allowable transmission power is different depending on the performance and operation point of the power amplifier; therefore, the allowable transmission power at each of number of UL transmission antenna is defined at the time of designing the terminal 10.

Figure 3:
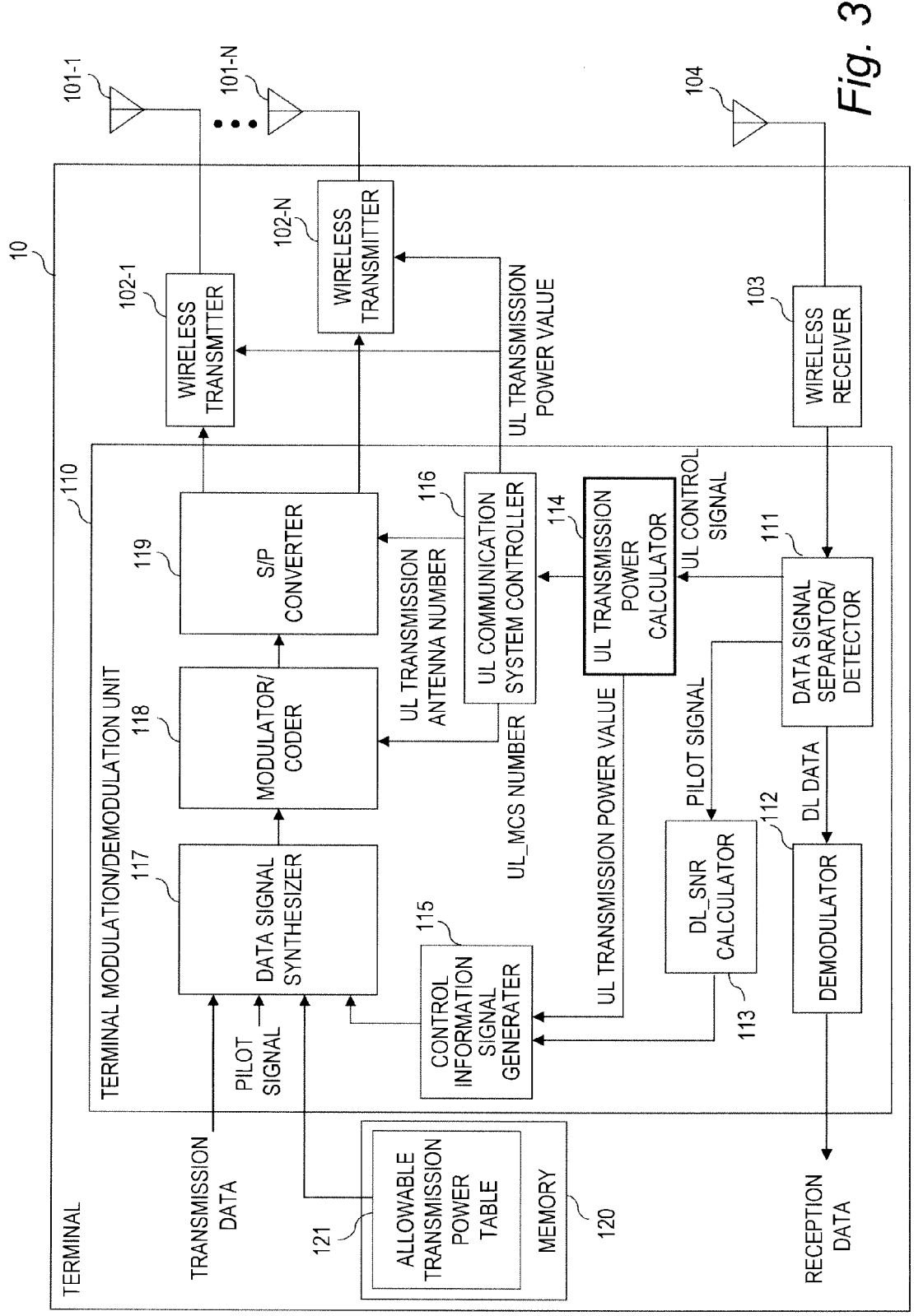
FIG. 3 is a block diagram illustrating a configuration of the terminal according to the first embodiment.

FIG. 3 is a block diagram illustrating a configuration of the mobile terminal 10 according to the first embodiment.

FIG. 3 illustrates a portion of the mobile terminal 10 of the first embodiment, which receives the DL signal S20 and transmits the UL signal S10 on the basis of the information of the acquired control signal S23. Although FIG. 3 illustrates only one reception antenna, MIMO reception using a plurality of antennas is also applicable.

The terminal 10 receives the DL signal S20 transmitted from the base station 20 with a reception antenna 104, and converts the signal into a digital signal in a wireless receiver 103. The wireless receiver 103 includes a wireless RF circuit for processing a high-frequency signal, an analog/digital converter (ADC) converting a detected analog signal into a digital signal, and an IQ demodulator converting the converted digital signal into an IQ signal. The signal output from the wireless receiver 103 is input to a terminal modulation/demodulation unit 110.

The terminal modulation/demodulation unit 110 demodulates the reception signal and modulates the transmission signal. The data transmitted to and received from the terminal 10 correspond to the data transmitted to and received from a backhaul interface.

A data signal separator/ detector 111 detects the received DL signal S20, and separates the DL data signal S21, the DL pilot signal S22, and the UL control signal S23 from the detected DL signal S20. After the separated DL data signal S21 is demodulated in a demodulator 112, the signal S21 serves as reception data. The DL pilot signal S22 is transmitted to a DL_SNR calculator 113 and the UL communication system control signal S23 is transmitted to a UL transmission power calculator 114.

The DL_SNR calculator 113 calculates the SNR value at the time of reception of the DL signal from the DL pilot signal S22 (F00). The calculated SNR value is used in case where the base station 20 determines the UL communication system (F10).

The UL transmission power calculator 114 calculates the this-time UL transmission power value using the increase or decrease value of the UL transmission power acquired from the information included in the UL communication control signal S23 and the previous-time UL transmission power value stored in the terminal 10 (F01). The calculated UL transmission power value is used in case where the base station 20 reallocates the transmission power (F20).

A control information signal generator 115 generates the DL information signal S13 to be notified to the base station 20 on the basis of the DL_SNR value S13-1 calculated in the DL_SNR calculator 113 and the UL transmission power value S13-2 calculated in the UL transmission power calculator 114. The generated DL information signal S13 is synthesized with the UL data signal S11 and the UL pilot signal S12 in a data signal synthesizer 117, so that the signals are included in the UL signal S10.

A UL communication system controller 116 controls the transmission of the UL signal S10 using the information of the UL communication control signal S23. The UL communication control signal S23 is separated into a UL_MCS number, a number of the UL transmission antenna, and a UL transmission power value. The separated UL_MCS number is transmitted to a modulator/encoder 118, the separated the number of the UL transmission antenna is transmitted to an S/P converter 119, and the separated UL transmission power value is transmitted to wireless transmitters 102-1 to 102-N. It should be noted that N corresponds to the number of transmission antennas included in the terminal 10.

The modulator/encoder 118 modulates the UL signal S10 using the modulation and coding scheme of the acquired UL_MCS number.

The serial/parallel converter (S/P converter) 119 allocates the data received by the backhaul interface to the plurality of wireless transmitters 102. At this time, by changing the number of the wireless transmitters 102 to which the data are allocated on the basis of the acquired information on the number of the UL transmission antenna, the number of transmission antennas used for transmitting the UL signal S10 is controlled. The wireless transmitter 102 to which the data are not allocated is in a resting state, so that the power consumption can be suppressed.

The wireless transmitter 102 includes an IQ modulator converting an IQ signal into a digital signal, a digital/analog converter (DAC) converting a digital signal into an analog signal, and a wireless RF circuit for generating a high-frequency signal. The wireless transmitter 102 controls the UL transmission power by adjusting the output of the power amplifier in the wireless RF circuit on the basis of the calculated UL transmission power value. In the case where the UL transmission power value is allocated for every stream, the transmission power is controlled in each of the wireless transmitters 102-1 to 102-N.

A memory 120 stores an allowable transmission power table 121 including the allowable transmission power data to be transmitted to the base station 20. After the connection with the base station 20 is established (S00), the terminal device 10 transmits the data of the allowable transmission power table 121 to the base station 20 upon the receipt of the allowable transmission power notification (S01).

Figure 4:
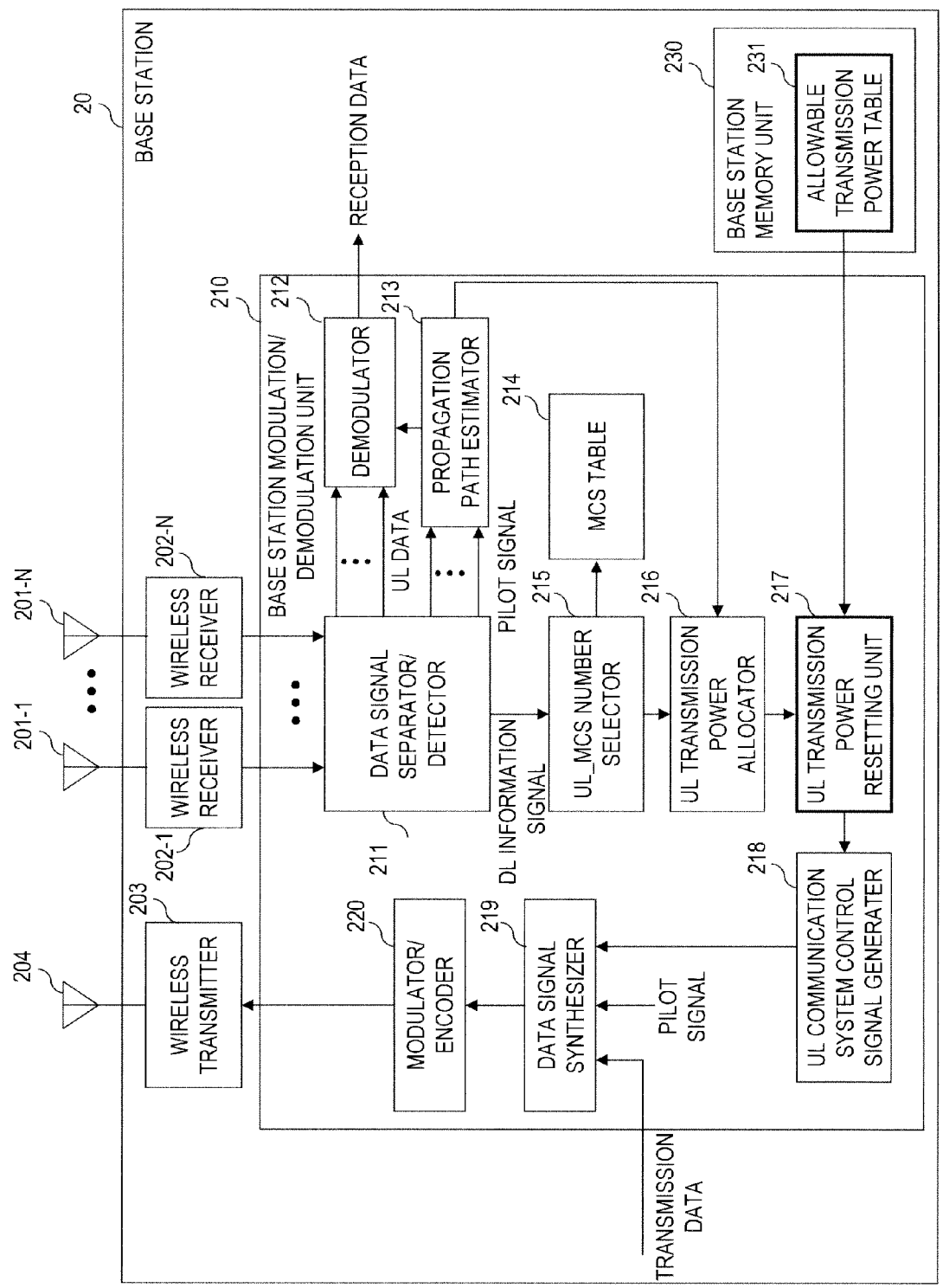
FIG. 4 is a block diagram illustrating a configuration of the base station according to the first embodiment.

FIG. 4 is a block diagram illustrating a configuration of the base station 20 according to the first embodiment.

The base station 20 according to the first embodiment includes an allowable transmission power table 231, and a UL transmission power resetting unit 217.

FIG. 4 illustrates a portion of the base station 20 according to the first embodiment, which receives the UL signal S10, determines the UL communication system (F10), resets the transmission power (F20), and notifies the terminal 10 of the UL control signal S23 when the DL signal S20 is transmitted. Although FIG. 3 illustrates only one transmission antenna, MIMO transmission may be employed in which a plurality of antennas is used.

First, in the signal processing by the base station 20, wireless receivers 202-1 to 202-N convert the UL signals S10 received by a plurality of reception antennas 201-1 to 201-N into digital signals. The wireless receivers 202 each include a wireless RF circuit for processing a high-frequency signal, an analog/digital converter (ADC) converting a detected analog signal into a digital signal, and an IQ demodulator converting the digital signal into an IQ signal. It should be noted that N corresponds to the number of reception antennas included in the base station 20.

A base station modulation/demodulation unit 210 demodulates the reception signal and modulates the transmission signal. The data transmitted to and received from the base station 20 are the data transmitted to and received from the backhaul interface.

A data signal separator/detector 211 detects the received UL signal S10 and separates the UL data signal S11, the UL pilot signal S12, and the DL information signal S13 from the detected UL signal. After the separated data signal S11 is demodulated in a demodulator 212, the signal serves as the reception data. The UL pilot signal S12 is transmitted to a propagation path estimator 213, and the DL information signal S13 is transmitted to a UL_MCS number selector 215.

The propagation path estimator 213 calculates the status of the propagation path in each stream from the pilot signal S12. As for the processing in the propagation path estimator 213, the stream signals that are mutually affected by the interference due to the MIMO transmission are detected and separated using the information of each propagation path. In case where the MIMO transmission is applicable to the native mode transmission (transmission technique that achieves improvement in the throughput by transmitting a different piece of data for every stream), a transmission power allocator 216 allocates the appropriate transmission power according to the propagation path status for every stream.

Figures 5, 6:
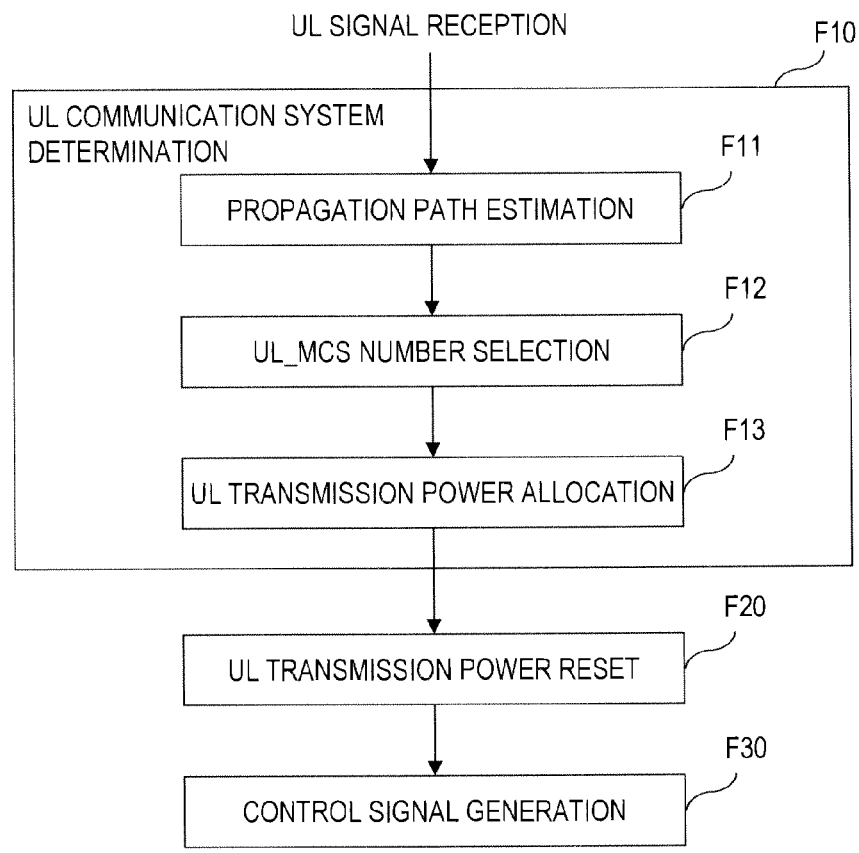
FIG. 5 is an explanatory diagram illustrating an example of an MCS table according to the first embodiment.
FIG. 6 is a flow chart illustrating a communication system determining process when transmitting UL signal according to the first embodiment.

As illustrated in FIG. 5, an MCS table 214 includes the information on a set of the modulation system corresponding to the specification (64 QAM, 16 QAM, QPSK, or the like) and the coding rate, the transmission bit number, and target SNR in accordance with the MCS number. The transmission bit number at each MCS number is determined based on the product of bit number determined by the modulation method (64 QAM: 6 bits, 16 QAM: 4 bits, and QPSK: 2 bits), and the coding rate.

The UL_MCS selector 215 determines the target SNR, which is the target at the next-time DL signal transmission, on the basis of the DL_SNR value acquired from the DL information signal S13, and selects the optimal MCS number for the determined target SNR. For example, according to the MCS table 214, in case where the acquired DL_SNR value is 11 dB, the SNR becomes 12.7 dB by increasing the UL transmission power by 1.7 dB. In this case, 16 QAM can be employed as the modulation method and ¾ can be used as the coding rate. Accordingly, the target SNR is set to 12.7 dB and 3 is selected as the MCS number.

The UL transmission power allocator 216 calculates the amount of increase or decrease of the UL transmission power of each stream using the propagation path information and the target SNR value of the MCS number. For example, as in the aforementioned example, in case where the DL_SNR value is 11.0 dB and the target SNR is set to 12.7 dB, the transmission power is determined so that the transmission power of all the streams is increased by 1.7 dB.

In case where the increase in transmission power causes the large loss of the propagation path in a certain stream, so that a very large amount of power is necessary to achieve the target SNR, control may be made so that the data are not transmitted in that stream and the number of UL transmission antennas is reduced.

The UL transmission power resetting unit 217 calculates the total of the next-time UL transmission power using the amount of increase or decrease of the transmission power of each stream determined in stages up to the previous stage and using the previous-time UL transmission power value S13-2 acquired from the DL information signal S13, and compares the calculated total transmission power and the allowable transmission power. In case where the total transmission power is less than or equal to the allowable transmission power, a UL communication system control signal generator 218 generates the UL control signal S23.

Meanwhile, in case where the total transmission power is more than the allowable transmission power, the base station 20 resets one of or both the UL_MCS number and the number of the UL transmission antenna, and controls the MIMO transmission so as to decrease the total transmission power. The details of this control are described with reference to FIGS. 6 and 7.

A base station memory unit 230 holds the allowable transmission power table 231. The allowable transmission power table 231 includes the allowable transmission power data compared in the UL transmission power resetting unit 217. For example, in the first embodiment, the allowable transmission power included in the allowable transmission power notification S01 is stored at the time of establishing the connection between the terminal 10 and the base station 20 (S00).

A data signal synthesizer 219 synthesizes the UL control signal S23 generated by the UL communication system control signal generator 218, the DL data signal S21, and the DL pilot signal S22, thereby generating the DL signal S20. A modulator/encoder 220 modulates the generated DL signal S20.

A wireless transmitter 203 converts the modulated DL signal S20 into an analog signal, and transmits the analog signal from a transmission antenna 204. Here, the wireless transmitter 203 includes a DAC converting a digital signal into an analog signal, an IQ demodulator converting an IQ signal into a digital signal, and a wireless RF circuit for generating a high-frequency signal.

FIG. 6 is a flow chart illustrating the communication system determining process when transmitting the UL signal according to the first embodiment, and illustrates the flow from the reception of the UL signal at the base station 20 to the generation F30 of the UL control signal S23.

In the UL communication system determination F10, first, propagation path estimation process F11 is performed in which the propagation path estimator 213 calculates the status of the propagation path in each stream from the pilot signal S12. After that, the UL_MCS selector 215 determines the target SNR, which is the target at the next-time DL signal transmission, and performs UL_MCS number selection process F12 for selecting the optimal MCS number for the determined target SNR. Moreover, the UL transmission power allocator 216 performs UL transmission power allocating process F13 in which the amount of increase or decrease of the UL transmission power of each stream is calculated using the target SNR value of the MCS number and the propagation path information.

Next, the UL transmission power resetting unit 217 resets the number of the UL transmission antenna and the UL_MCS number (F20). The details of the UL transmission power resetting process are described with reference to FIG. 7. The UL transmission power resetting process can prevent the excess beyond the default power consumption of the terminal 10.

Then, the data signal synthesizer 219 executes the UL control signal generation process F30 for generating the DL signal S20.

Figure 7:
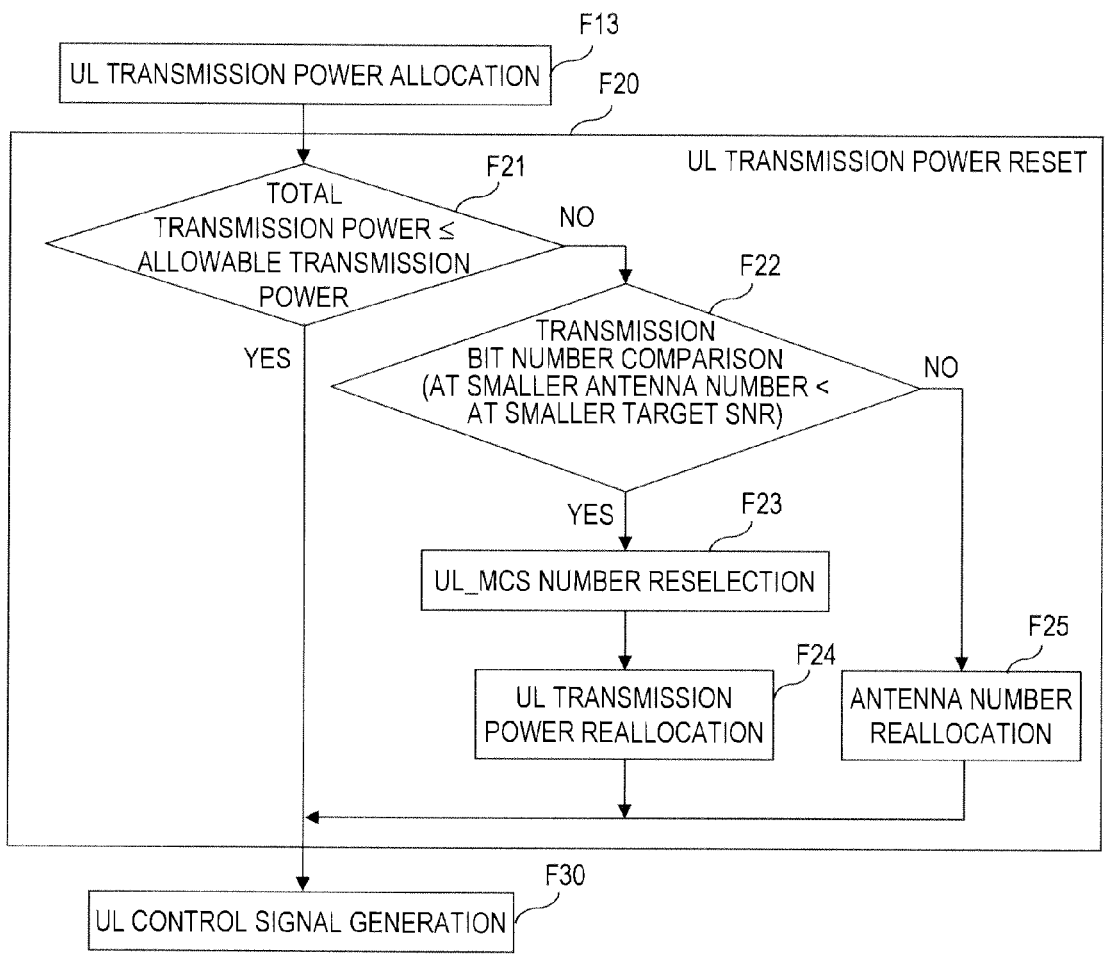
FIG. 7 is a detailed flow chart illustrating UL transmission power resetting process according to the first embodiment.

FIG. 7 is a detailed flow chart illustrating the UL transmission power resetting process F20 according to the first embodiment.

First, in the UL transmission power resetting process F20, the total transmission power of the streams is compared with the allowable transmission power (F21). In case where the total transmission power is less than or equal to the allowable transmission power, in the UL control signal generation F30, the base station 20 notifies the terminal 10 of the determined UL transmission power and UL_MCS number without change, and controls the transmission at the UL transmission time.

On the other hand, in case where the total transmission power is more than the allowable transmission power, the transmission bit numbers are compared by the following two methods for suppressing the transmission power (F22):

(1) the UL_MCS number is changed to reduce the target SNR value, thereby reducing the required UL transmission power; and (2) one of the transmission antennas used by the terminal 10 is eliminated, thereby reducing the total of the UL transmission power of the streams.

In F22, the two methods are compared and the method that allows transmission with more bits is selected.

In case where the transmission bit number at the smaller target SNR value is large as a result of the comparison in F22, the UL_MCS number is selected again (F23) and the UL transmission power is reallocated (F24). After that, the UL control signal is generated (F30).

On the other hand, in case where the transmission bit number is large at fewer number of the antenna, the number of the antenna is reallocated (F25). After that, the UL control signal is generated (F30).

It should be noted that in the first embodiment, the two methods are compared in a state that the total transmission power is less than or equal to the allowable transmission power in comparing the transmission bit number in F22; however, the transmission bit numbers may be compared (F22) and the transmission power may be controlled by the selected method, and then the total of the current transmission power may be compared (F21) again with the current allowable transmission power.

It should be noted that although the UL communication system determination process F10 and the UL transmission power resetting process F20 are performed separately the first embodiment, a process having the two processes integrated may be performed alternatively.

The UL transmission power resetting process (F20) may be performed by the terminal 10 instead of by the base station 20. The UL transmission power resetting process (F20) is desirably performed by the base station 20 as illustrated. This is because the base station 20 performs the process, obtains the status of all the terminals 10 in the cell is, and can control the terminals 10.

Further, in the first embodiment, the communication system (modulating system, coding rate, MIMO multiplexing number) is determined so that the total transmission power is less than or equal to the allowable transmission power in F23 and F25. Alternatively, in F23 and F25, the communication system (modulating system, coding rate, MIMO multiplexing number) may be changed again so that the transmission power is reduced by one stage and the total transmission power and the allowable transmission power may be compared again in F21; if the total transmission power is more than the allowable transmission power, the communication system (modulating system, coding rate, MIMO multiplexing number) may be changed again.

Further, whether the UL_MCS is changed or the number of the transmission antenna is reduced may be determined based on the degree of difference between the total transmission power and the allowable transmission power in F22. The amount of change in UL_MCS or the number of transmission antennas to be reduced may be determined based on the degree of difference between the total transmission power and the allowable transmission power in F22.

FIGS. 8 and 9 illustrate the specific examples of resetting the transmission power according to the first embodiment. In the specific examples illustrated in FIGS. 8 and 9, the terminal 10 includes four transmission antennas, and the selectable MCS and the target SNR are as illustrated in FIG. 5. It is assumed that the default maximum transmission power is 23.0 dBm and the allowable transmission power is as shown in FIG. 2. It should be noted that the transmission bit number can be calculated by the product of the number of the UL transmission antenna and the value at each MCS number illustrating in FIG. 5.

The example shown in FIG. 8 is based on the case in which the target SNR is 17 dB, the total transmission power of the streams is 21.0 dBm, and the modulation and coding scheme determined by the UL_MCS is determined as 64 QAM and ¾ in the UL communication system determination process F10. The total transmission power of the conventional base station 20 is 21.0 dBm, which is less than a default value of 23.0 dBm; therefore, the base station 20 generates the control signal using the determined value (21 dBm) (S30), and transmits the generated control signal to the terminal 10. However, in case where the total of the determined transmission power and the information of the allowable transmission power table 231 are compared, the total transmission power is more than the allowable transmission power 20.0 dBm in the case of using four UL antennas. In case where the terminal 10 transmits the signal at this power, the transmission power exceeds the default power consumption value.

In view of this, the aforementioned two methods are compared for reducing the total transmission power. In case where the MCS number shown in an MCS table 207 is reduced by one using the method (1) to reduce the target SNR to 14 dB, the necessary transmission power decreases to 18.0 dBm. However, the coding rate decreases from ¾ to ⅔, and the transmission bit number becomes 16 bits. Meanwhile, in case where the number of the UL antenna is changed from four to three using the method (2), the transmission power decreases to 19.5 dBm. Although the transmission power, the modulating system, and the coding rate of the three antennas do not change, the transmission bit number becomes 13.5 bits due to the decrease of the number of the UL transmission antennas.

As a result, the total transmission power is less than or equal to the allowable transmission power in the both methods; therefore, the method (1) that allows transmission with more bits is selected.

The example shown in FIG. 9 corresponds to the case in which the loss is larger than that shown in the example of FIG. 8. In the example shown in FIG. 9, it is assumed that the target SNR is 13 dB, the total of the transmission power of the streams is 21.5 dBm, and the modulation and coding scheme determined by the UL_MCS is 16 QAM and ¾ in the UL communication system determination process F10. Even in this case, the total transmission power, 21.5 dBm, is more than the allowable transmission power, 20.0 dBm; therefore, the two methods are compared.

In case where the MCS number shown in the MCS table 207 is reduced by one using the method (1) to reduce the target SNR to 9 dB, the necessary transmission power decreases to 17.5 dBm. However, the coding rate decreases from ¾ to ½, and the transmission bit number becomes 8 bits. Meanwhile, in case where the number of the UL antenna is changed from four to three using the method (2), the transmission power decreases to 20.0 dBm, and the transmission power and the modulation and coding scheme of the three antennas do not change and the transmission bit number becomes 9 bits.

As a result, the total transmission power is less than or equal to the allowable transmission power in the both methods; therefore, the method (2) that allows transmission with more bits is selected.

As described so far, according to the first embodiment, the MIMO transmission can be correctly controlled considering the specification and individual difference for every terminal model and the throughput according to the communication environment can be improved in the range of the specification of the power consumption. Further, by suppressing the UL transmission power by selecting from the two methods, the optimal scheduling according to the propagation path status can be performed while the MIMO transmission is controlled on the base station 20 side so as not to exceed the power consumption of the terminal 10.

Further, since the terminal 10 notifies the allowable transmission power at the time of establishing the connection, the upper limit of the transmission power can be individually controlled for every terminal 10.

<Second Embodiment>

The second embodiment describes the terminal 10 having a power-saving function. Even the terminal in which the allowable transmission power as described in the first embodiment is not set can control the power consumption in accordance with the remaining battery charge of the terminal or a user's selection by applying the present invention.

Figures 10, 11:
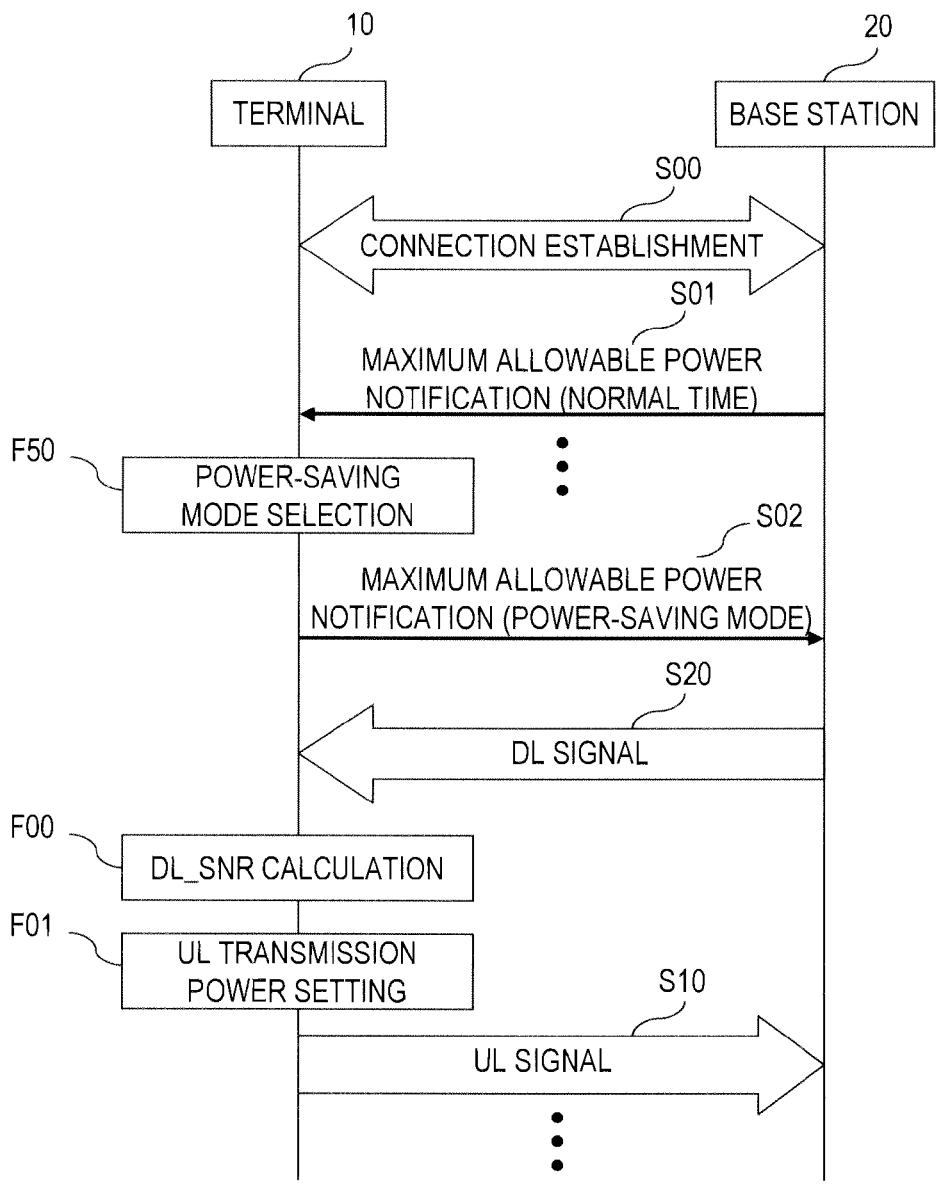
FIG. 10 is an explanatory diagram illustrating allowable transmission power at normal time and power-saving mode time of a terminal according to a second embodiment.
FIG. 11 is a sequence diagram illustrating exchange of data between a base station and the terminal having a function of reducing the power consumption according to the second embodiment.

FIG. 10 illustrates the allowable transmission power at normal time and power-saving mode time of the terminal 10 according to the second embodiment. Unlike in the first embodiment, the allowable transmission power in the second embodiment is not the value set so as not to exceed the default power consumption of the terminal 10 but is the value set to suppress the power consumption of the terminal 10 for the purpose of driving the battery for a long time. Accordingly, the terminal 10 sets the allowable transmission power freely and holds the set allowable transmission power in the memory.

FIG. 11 is a sequence diagram illustrating the exchange of data between the base station 20 and the terminal 10 having a function of reducing the power consumption according to the second embodiment.

The terminal 10 notifies the base station 20 of the information of the allowable transmission power at the time of establishing the connection (S00) in the first embodiment; in the second embodiment, however, the terminal 10 transmits the information of the allowable transmission power to the base station 20 (S02) in case where a user selects the power-saving mode (F50).

In the second embodiment, as shown in FIG. 11, the base station 20 holds the information of the allowable transmission power of the terminal 10, and the power consumption of the terminal 10 may be suppressed by transmitting the information on the remaining battery charge of itself to the base station 20.

Moreover, in the second embodiment, a user selects the power-saving mode; alternatively, the terminal 10 may monitor the remaining battery charge of the terminal 10 and may transmit the allowable transmission power determined by the value of the remaining battery charge to the base station 20.

As described so far, according to the second embodiment, the UL transmission power is suppressed by the remaining battery charge or the selection by a user, so that the optimal scheduling according to the propagation path status can be performed while the MIMO transmission is controlled on the base station 20 side so as not to exceed the power consumption of the terminal 10.

Moreover, the MIMO transmission can be correctly controlled considering the specification and the individual difference of every terminal model and the throughput according to the communication environment can be improved in the range of the specification of the power consumption.

In the aforementioned Examples, the transmission power of all the streams is increased evenly and the transmission is stopped for each stream depending on the propagation path status; however, the MIMO transmission may be controlled so as to increase or decrease the transmission power according to the propagation path status for each stream.

While the present invention has been described in detail and pictorially in the accompanying drawings, the present invention is not limited to such detail but covers various obvious modifications and equivalent arrangements, which fall within the purview of the appended claims.

What is claimed is:

1. A wireless communication system for performing MIMO transmission, comprising:
a terminal device configured to employ a MIMO technique on at least a transmission side; and
a base station configured to communicate with the terminal device, wherein:
the terminal device includes a plurality of wireless transmitters, a transmission antenna coupled to each of the wireless transmitters, and a controller configured to generate a signal to be transmitted from the antenna;
the base station includes a plurality of wireless receivers, a reception antenna coupled to each of the wireless receivers, and a controller configured to generate a control signal to be transmitted to the terminal device;
the terminal device is configured to hold a predetermined upper limit of power consumption; and
the base station is configured to change at least one of a MIMO multiplexing number, a modulation system, and a coding rate so that communication is performed according to a communication system that can communicate at allowable transmission power of the terminal device in case where power consumption of the terminal device exceeds the upper limit upon performing the MIMO transmission at maximum transmission power according to the wireless standard, wherein:
the terminal device is configured to transmit the allowable transmission power to the base station;
the base station is configured to compare the received allowable transmission power with transmission power included in the control signal transmitted to the terminal device;
the base station is configured to change at least one of a MIMO multiplexing number, a modulation system, and a coding rate to determine the communication system that can communicate at the allowable transmission power of the terminal device in case where the power consumption of the terminal exceeds the upper limit upon performing the MIMO transmission at the transmission power included in the control signal;
the base station is configured to notify the terminal of the determined communication system; and
the terminal device is configured to communicate within the upper limit of the power consumption by changing the communication system in accordance with the notification.

2. The wireless communication system according to claim 1, wherein the base station is configured to select the communication system and determine the transmission power that allows communication by the selected communication system.

3. The wireless communication system according to claim 1, wherein:
the base station is configured to change at least one of the modulating system and the coding rate so that the transmission rate is decreased, or change to reduce the MIMO multiplexing number in order to reduce the transmission power to be notified to the terminal device in case where the power consumption of the terminal device exceeds the upper limit as a result of comparing the received allowable transmission power and the transmission power included in the control signal to be transmitted to the terminal device; and
the base station is configured to select one method that achieves a higher transmission rate from the two changes.

4. The wireless communication system according to claim 1, wherein the terminal device is configured to transmit the base station of the allowable transmission power which is set based on remaining battery charge of the terminal device or selection by a user.

5. A communication method in a wireless communication system performing MIMO transmission, wherein:

the wireless communication system includes a terminal device employing a MIMO technique on at least a transmission side, and a base station communicating with the terminal device;

the terminal device includes a plurality of wireless transmitters, a transmission antenna coupled to each of the wireless transmitters, and a controller generating a signal to be transmitted from the antenna;

the base station includes a plurality of wireless receivers, a reception antenna coupled to each of the wireless receivers, and a controller generating a control signal to be transmitted to the terminal device;

the terminal device holds a predetermined upper limit of power consumption; and the method includes steps of:

changing, by the terminal device, at least one of a MIMO multiplexing number, a modulation system, and a coding rate in case where power consumption of the terminal device exceeds the upper limit upon performing the MIMO transmission at maximum transmission power according to the wireless standard;

communicating, by the terminal device, according to a communication system that can communicate at allowable transmission power of the terminal device;

transmitting, by the terminal device, the allowable transmission power to the base station;

comparing, by the base station, the received allowable transmission power with transmission power included in the control signal transmitted to the terminal device;

changing, by the base station, at least one of a MIMO multiplexing number, a modulation system, and a coding rate to determine a communication system that can communicate at the allowable transmission power of the terminal device in case where the power consumption of the terminal exceeds the upper limit upon performing the MIMO transmission at the transmission power included in the control signal;

notifying, by the base station, the terminal of the determined communication system; and communicating, by the terminal device, within the upper limit of the power consumption by changing the communication system in accordance with the notification.

6. The communication method according to claim 5, including steps of:

selecting, by the base station, the communication system; and determining, by the base station, the transmission power that allows communication by the selected communication system.

7. The communication method according to claim 5, including steps of:

changing, by the base station, at least one of the modulating system and the coding rate so that the transmission rate is decreased, or changing, by the base station, to reduce the MIMO multiplexing number in order to reduce the transmission power to be notified to the terminal device in case where the power consumption of the terminal device exceeds the upper limit as a result of comparing the received allowable transmission power and the transmission power included in the control signal to be transmitted to the terminal device; and selecting, by the base station, one method that achieves a higher transmission rate from the two changes.

8. The communication method according to claim 5, including step of transmitting, by the terminal device, the base station of the allowable transmission power which is set based on remaining battery charge of the terminal device or selection by a user is transmitted.

9. A base station for communicating with a terminal device configured to employ a MIMO technique on at least a transmission side, wherein:

the terminal device includes a plurality of wireless transmitter, a transmission antenna coupled to each of the wireless transmitters, and a controller configured to generate a signal to be transmitted from the antenna;

the base station includes a plurality of wireless receivers, a reception antenna coupled to each of the wireless receivers, and a controller configured to generate a control signal to be transmitted to the terminal device;

the terminal device is configured to hold a predetermined upper limit of power consumption; and the base station is configured to change at least one of a MIMO multiplexing number, a modulation system, and a coding rate so that communication is performed according to a communication system that can communicate at allowable transmission power of the terminal device in case where power consumption of the terminal device exceeds the upper limit upon performing the MIMO transmission at maximum transmission power according to wireless standard, wherein:

the terminal device is configured to transmit the allowable transmission power to the base station;

the base station is configured to compare the received allowable transmission power with transmission power included in the control signal transmitted to the terminal device;

the base station is configured to change at least one of a MIMO multiplexing number, a modulation system, and a coding rate to determine a communication system that can communicate at the allowable transmission power of the terminal device in case where the power consumption of the terminal exceeds the upper limit upon performing the MIMO transmission at the transmission power included in the control signal;

the base station is configured to notify the terminal of the determined communication system; and the terminal device is configured to communicate within the upper limit of the power consumption by changing the communication system in accordance with the notification.

10. The base station according to claim 9, wherein the base station is configured to select the communication system and determine the transmission power that allows communication by the selected communication system.

11. The base station according to claim 9, wherein:

the base station is configured to change at least one of the modulating system and the coding rate so that the transmission rate is decreased, or change to reduce the MIMO multiplexing number in order to reduce the transmission power to be notified to the terminal device in case where the power consumption of the terminal device exceeds the upper limit as a result of comparing the received allowable transmission power and the transmission power included in the control signal to be transmitted to the terminal device; and the base station is configured to select one method that achieves a higher transmission rate from the two changes.

12. The base station according to claim 9, wherein the base station is configured to receive the allowable transmission power which is set based on remaining battery charge of the terminal device or selection by a user from the terminal device.

* * * * *